US007996466B2

(12) United States Patent
Wu et al.

(10) Patent No.: US 7,996,466 B2
(45) Date of Patent: Aug. 9, 2011

(54) APPARATUS AND METHOD FOR SUPPLYING REPORT CONTENT WITHIN COLLABORATIVE FRAMEWORKS

(75) Inventors: Ju Wu, Coquitlam (CA); Hlaing Than, Richmond (CA); Jared Elliot Haines, Vancouver (CA); Patrick Yee Cheuk Cheng, Vancouver (CA)

(73) Assignee: Business Objects Software Limited, Dublin (IE)

( * ) Notice: Subject to any disclaimer, the term of this patent is extended or adjusted under 35 U.S.C. 154(b) by 1151 days.

(21) Appl. No.: 11/488,463

(22) Filed: Jul. 17, 2006

(65) Prior Publication Data

US 2007/0266105 A1 Nov. 15, 2007

Related U.S. Application Data

(63) Continuation-in-part of application No. 11/394,641, filed on Mar. 31, 2006, now Pat. No. 7,899,162.

(51) Int. Cl.
G06F 15/16 (2006.01)
(52) U.S. Cl. ........................................ 709/204; 709/218
(58) Field of Classification Search .................. None
See application file for complete search history.

(56) References Cited

U.S. PATENT DOCUMENTS

| 7,149,776 | B1 | 12/2006 | Roy et al. | |
|---|---|---|---|---|
| 7,370,269 | B1 | 5/2008 | Prabhu et al. | |
| 7,543,237 | B2 * | 6/2009 | Kontny et al. | 715/759 |
| 7,899,162 | B2 * | 3/2011 | Wu et al. | 709/205 |
| 2004/0054802 | A1 | 3/2004 | Beauchamp et al. | |
| 2004/0215610 | A1 | 10/2004 | Dixon et al. | |
| 2004/0252134 | A1 * | 12/2004 | Bhatt et al. | 345/619 |
| 2005/0188016 | A1 | 8/2005 | Vdaygiri et al. | |
| 2006/0010197 | A1 | 1/2006 | Ovenden | |
| 2006/0026145 | A1 * | 2/2006 | Beringer et al. | 707/3 |
| 2006/0026231 | A1 * | 2/2006 | Degenhardt et al. | 709/204 |
| 2006/0026235 | A1 | 2/2006 | Schwartz et al. | |
| 2006/0041844 | A1 | 2/2006 | Homiller | |

FOREIGN PATENT DOCUMENTS

EP 1075119 2/2001
JP 2005250947 A * 9/2005

* cited by examiner

Primary Examiner — Patrice L Winder
(74) Attorney, Agent, or Firm — Mintz, Levin, Cohn, Ferris, Glovsky and Popeo, P.C.

(57) ABSTRACT

A computer readable medium includes executable instructions to monitor the exchange of messages between a first computer and a second computer in a network. Context from the messages is assembled. The context is used to form a query. The query is applied to one or more report documents.

13 Claims, 10 Drawing Sheets

APPARATUS AND METHOD FOR SUPPLYING REPORT CONTENT WITHIN COLLABORATIVE FRAMEWORKS

CROSS REFERENCE TO RELATED APPLICATIONS

This application is a continuation-in-part of the pending U.S. patent application entitled "Apparatus and Method for Report Sharing within an Instant Messaging Framework", Ser. No. 11/394,641, filed Mar. 31, 2006, which is incorporated herein by reference.

This application is related to the following concurrently filed, commonly owned U.S. patent application entitled, "Apparatus and Method for Report Sharing within an Instant Messaging Framework", Ser. No. 11/488,459, filed Jul. 17, 2006, which is incorporated herein by reference.

BRIEF DESCRIPTION OF THE INVENTION

This invention relates generally to reporting and collaborative working environments. More particularly, this invention relates to supplying and sharing report documents in a collaborative working environment, such as, an instant messaging framework, internet forum, or email exchange.

BACKGROUND OF THE INVENTION

Instant messaging refers to real time communication between two or more people over a network, such as the Internet. A user requires a client program and a connection to an instant messaging service. Usually the instant messaging service is administered by an instant messenger server. The composition and function of these servers are well known in the art. Once connected to an instant messaging service, users can send messages, including text and graphics, in real time. The activity is often referred to as "chatting". A conversation can be held with two or more people on the same computer, network, or across the Internet.

Another contemporary working environment is email. Email refers to asynchronous communication between two or more people over a network, such as the Internet. A series of related email, usually in the format of original message, reply, re-reply, etc., form a thread. An email thread is not usually made publicly available or remotely accessible.

A forum, or Internet forum, is an application on the internet for holding discussions. These include web-based forums, dial-up bulletin boards, and Internet newsgroups. Most forum software allows a plurality of threads to coexist. These threads hold messages created by users. Users can post entries in existing threads or start new threads. Forum software packages are widely available on the Internet, and are written in a variety of programming languages, such as PHP, Perl, Java and ASP. The configuration and records of posts can be stored in text files or in a database. Each package offers a different variety of features, from the most basic providing text-only postings to more advanced packages offering multimedia support and formatting. Many packages can be integrated into an existing website to allow visitors to post comments. One significant difference between forums and electronic mail is that email is automatically delivered to the recipients, while forums require the member to visit the forum.

Business Intelligence (BI) generally refers to software tools used to improve business enterprise decision-making. These tools are commonly applied to financial, human resource, marketing, sales, customer and supplier analyses. More specifically, these tools can include: reporting and analysis tools to present information; content delivery infrastructure systems for delivery and management of reports and analytics; data warehousing systems for cleansing and consolidating information from disparate sources; and data management systems, such as relational databases or On Line Analytic Processing (OLAP) systems used to collect, store, and manage raw data.

A subset of business intelligence tools are report generation tools. There are a number of commercially available products to produce reports from stored data. For instance, Business Objects Americas of San Jose, Calif., sells a number of widely used report generation products, including Crystal Reports™, Business Objects OLAP Intelligence™, Business Objects Web Intelligence™, and Business Objects Enterprise™. As used herein, the term report refers to information automatically retrieved (i.e., in response to computer executable instructions) from a data source (e.g., a database, a data warehouse, a plurality of reports, and the like), where the information is structured in accordance with a report schema that specifies the form in which the information should be presented. A non-report is an electronic document that is constructed without the automatic retrieval of information from a data source. Examples of non-report electronic documents include typical business application documents, such as a word processor document, a presentation document, and the like.

A report document specifies how to access data and format it. A report document where the content does not include external data, either saved within the report or accessed live, is a template document for a report rather than a report document. Unlike other non-report documents that may optionally import external data within a document, a report document by design is primarily a medium for accessing and formatting, transforming or presenting external data.

A report is specifically designed to facilitate working with external data sources. In addition to information regarding external data source connection drivers, the report may specify advanced filtering of data, information for combining data from different external data sources, information for updating join structures and relationships in report data, and logic to support a more complex internal data model (that may include additional constraints, relationships, and metadata).

In contrast to a spreadsheet, a report is generally not limited to a table structure but can support a range of structures, such as sections, cross-tables, synchronized tables, sub-reports, hybrid charts, and the like. A report is designed primarily to support imported external data, whereas a spreadsheet equally facilitates manually entered data and imported data. In both cases, a spreadsheet applies a spatial logic that is based on the table cell layout within the spreadsheet in order to interpret data and perform calculations on the data. In contrast, a report is not limited to logic that is based on the display of the data, but rather can interpret the data and perform calculations based on the original (or a redefined) data structure and meaning of the imported data. The report may also interpret the data and perform calculations based on pre-existing relationships between elements of imported data. Spreadsheets generally work within a looping calculation model, whereas a report may support a range of calculation models. Although there may be an overlap in the function of a spreadsheet document and a report document, these documents express different assumptions concerning the existence of an external data source and different logical approaches to interpreting and manipulating imported data.

To date, collaborative working environments, business intelligence, and particularly report generation techniques, have operated in different domains. It would be desirable to provide techniques to integrate these separate domains.

SUMMARY OF INVENTION

The invention includes a computer readable medium with executable instructions to monitor the exchange of messages between a first computer and a second computer in a network. Context from the messages is assembled. The context is used to form a query. The query is applied to one or more report documents.

The invention also includes a computer readable medium with executable instructions to facilitate an instant messaging conversation between a first computer and a second computer on a network. Text from the instant messaging conversation is processed. Context is extracted from the instant messaging conversation. The context is used to form a query. the query is applied to a plurality of report documents.

The invention also includes a computer implemented method of gathering a first plurality of messages between a first computer and a second computer. The first plurality of messages are mined for context. A query is executed based on the context. The results of the query are then displayed. The results of the query include at least one report.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
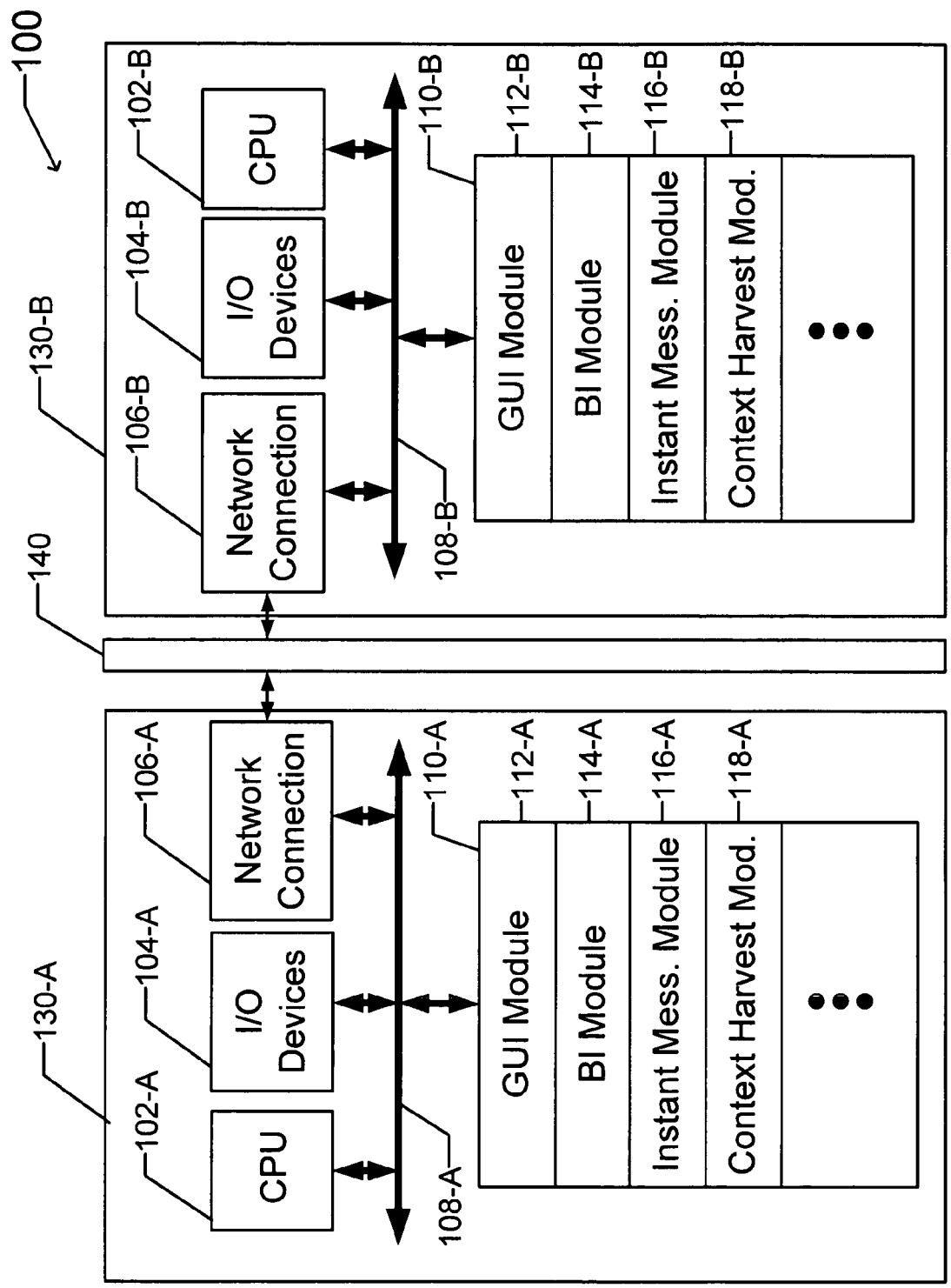
FIG. 1 illustrates a system 100 configured in accordance with an embodiment of the invention.

FIG. 1 illustrates a system 100 configured in accordance with an embodiment of the invention. The system 100 includes one or more coupled computers, e.g., arranged in a peer-to-peer architecture. The system 100 includes a first computer 130-A, and a second computer 130-B. A data signal can be sent from the first computer, via communication channel 140, to the second computer and vice versa.

Each computer 130 includes a central processing unit 102 connected to a set of input/output devices 104 and a network connection circuit 106 via a bus 108. As shown in FIG. 1, computer 130-A includes a CPU 102-A, input/output devices 104-A, a network connection circuit 106-A, and a bus 108-A, while computer 130-B includes a CPU 102-B, input/output devices 104-B, a network connection circuit 106-B, and a bus 108-B. For the purpose of simplicity, individual components, e.g., 102-A and 102-B, are collectively referenced only by their number, e.g., 102.

The input/output devices 104 may include standard components, such as keyboard, mouse, display, printer, and the like. The network connection circuit 106 provides connectivity to communication channel 140.

Also connected to the bus 108 is a memory 110. The memory 110 stores executable instructions to implement operations of the invention. In an embodiment the memory 110 stores one or more of the following modules: a graphical user interface (GUI) module 112, a BI module 114, an instant messaging module 116, and a context harvest module 118.

The GUI module 112 may rely upon standard techniques to produce graphical components of a user interface, e.g., windows, icons, buttons, menus and the like, examples of which are discussed below. The user interface may include instructions to receive input from a pointer device and display a cursor on an output device.

The BI module 114 includes executable instructions to perform BI related functions on computers 130-A or 130-B, or across network 140 or a wider network. BI related functions include: generating reports (locally or on a server), viewing a report, performing query and analysis, and the like. In an embodiment, the BI module 114 can include a report module, a server communications module, and the like, as sub-modules.

The instant messaging module 116 includes executable instructions to participate in or implement an instant messaging conversation between two or more parties across network 140 or a wider network. In an embodiment of the present invention, the instant messaging module 116 is replaced by a web browser module or the like. The replacement module includes executable instructions that allow a user to view and post entries on an Internet forum. In an embodiment of the present invention the instant messaging module 116 is replaced by an email module. The email module includes executable instructions to allow a user to send and receive emails.

The context harvest module 118 includes executable instructions to implement functions for harvesting context from the collaborative working environment in order to search reports. One type of search specifies a parameter of a report. Another type of search associates one or more words with a view of the report. Searching also includes locating reports and harvesting context generated in the collaborative working environment and using this context to generate a query over a set of reports.

The modules stored in memory 110 are exemplary. Additional modules such as an operating system can be included. It should be appreciated that the functions of the presented modules may be combined. In addition, a function of a module need not be performed on a single machine, e.g., the first computer or the second computer. Instead, the function may be distributed across system 100 or a wider network, if desired. In an embodiment of the present invention, the system 100 may operate in a non-peer-to-peer architecture unifying all or part of the operations associated with the computers of system 100.

Figure 2:
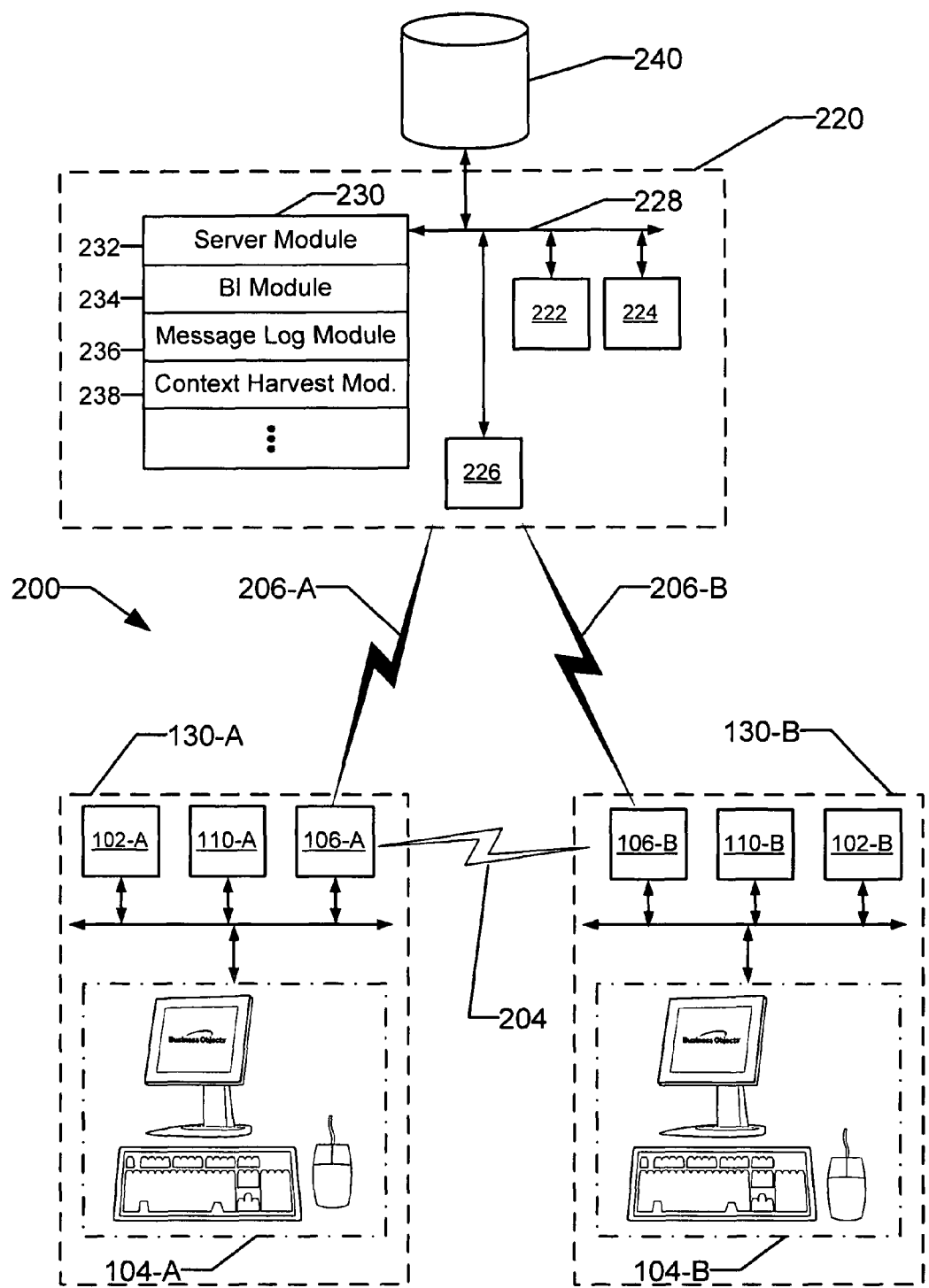
FIG. 2 illustrates a network architecture configured in accordance with an embodiment of the invention.

FIG. 2 illustrates a network architecture 200 in accordance with an embodiment of the invention. Computers 130-A and 130-B of FIG. 1 are coupled by a set of data signals 204. These computers are also coupled by sets of data signals 206-A and 206-B to a server 220.

The input/output devices 104 of computers 130-A and 130-B can include input devices such as a keyboard, mouse, and monitor. In addition input/output devices 104 may include input/output devices such as handwriting recognition tablets, touch screen displays, scanners, printers, and the like. Indeed, in an embodiment either of computers 130-A and 130-B could be replaced by smaller computing device, such as, a handheld computer. In an embodiment, the role of the server 220 and one of the computers 130-A or 130-B can be combined.

The server 220 includes standard computing components for storing and processing of reports and hosting a collaborative working environment. In an embodiment, the server includes a central processing unit 222 connected to a set of input/output devices 224 and a network connection circuit 226 via a bus 228. The server can be coupled to a data store 240. Also connected to the bus 228 is a memory 230. The memory 230 stores executable instructions to implement operations of the invention. In an embodiment, the memory 230 stores one or more of the following modules: server module 232, BI module 234, message log module 236 and context harvest module 238. As with memory 110, the modules stored in memory 230 are exemplary The server module 232 includes executable instructions to implement a collaborative working environment. In one embodiment, the server module 232 includes executable instructions to host an instant messaging conversation between a plurality of users. In one embodiment, the server module 232 includes executable instructions to host an internet forum. In one embodiment, the server module 232 includes executable instructions to facilitate email transfer between a plurality of users.

The BI module 234 includes executable instructions to perform BI related functions on the server 220. These functions could be for computers 130-A or 130-B. BI related functions include: generating reports (locally or on a server), viewing a report, performing query and analysis, and the like. In an embodiment, the BI module 234 includes a report module, a searching module, and the like, as sub-modules. The search module includes executable instructions to implement functions for searching reports. The search module includes executable instructions to implement functions for searching over a plurality of reports and within a report.

The message log module 236 includes executable instructions to log the messages between a plurality of users. The context harvest module 238 includes executable instructions to harvest context from the messages. In one embodiment, the context module harvests context from the messages logged in the message log module 236. In another embodiment, the context module harvests context from messages before they are logged in the message log module 236. Functions of the executable instructions in the context harvest module 238 include: mining a set of words from context provided by messages in a collaborative working environment, associating one or more words or views of a report, and converting one or more words into a hyperlink.

Context includes one or more of the following criteria: the meaning of a message, its relationship to other messages, the environment in which the message occurred, who sent the message, who received the message, and any perceptions associated with the message. Context is generated in a collaborative working environment facilitated by the invention.

In an embodiment, the harvest module 238 includes a regular expression sub-module. The regular expression sub-module is used to exclude words that have little meaning and count the occurrences of nouns and other terms within a set of messages in a collaborative working environment.

In an embodiment, the harvest module 238 includes a natural language processing (NLP) sub-module. Natural language processing modules are well known in the art. The NLP sub-module includes executable instructions to facilitate the understanding of natural language, e.g., written English. These executable instructions convert natural language strings into more formal representations that are easier for computers 130 to interpret and manipulate. In an embodiment of the invention, the NLP sub-module includes instructions to detect and count the occurrences of nouns and noun phrases. In an embodiment, the NLP sub-module includes executable instructions to resolve co-references (where two blocks refer to same thing) between nouns and noun phrases.

Figure 3:
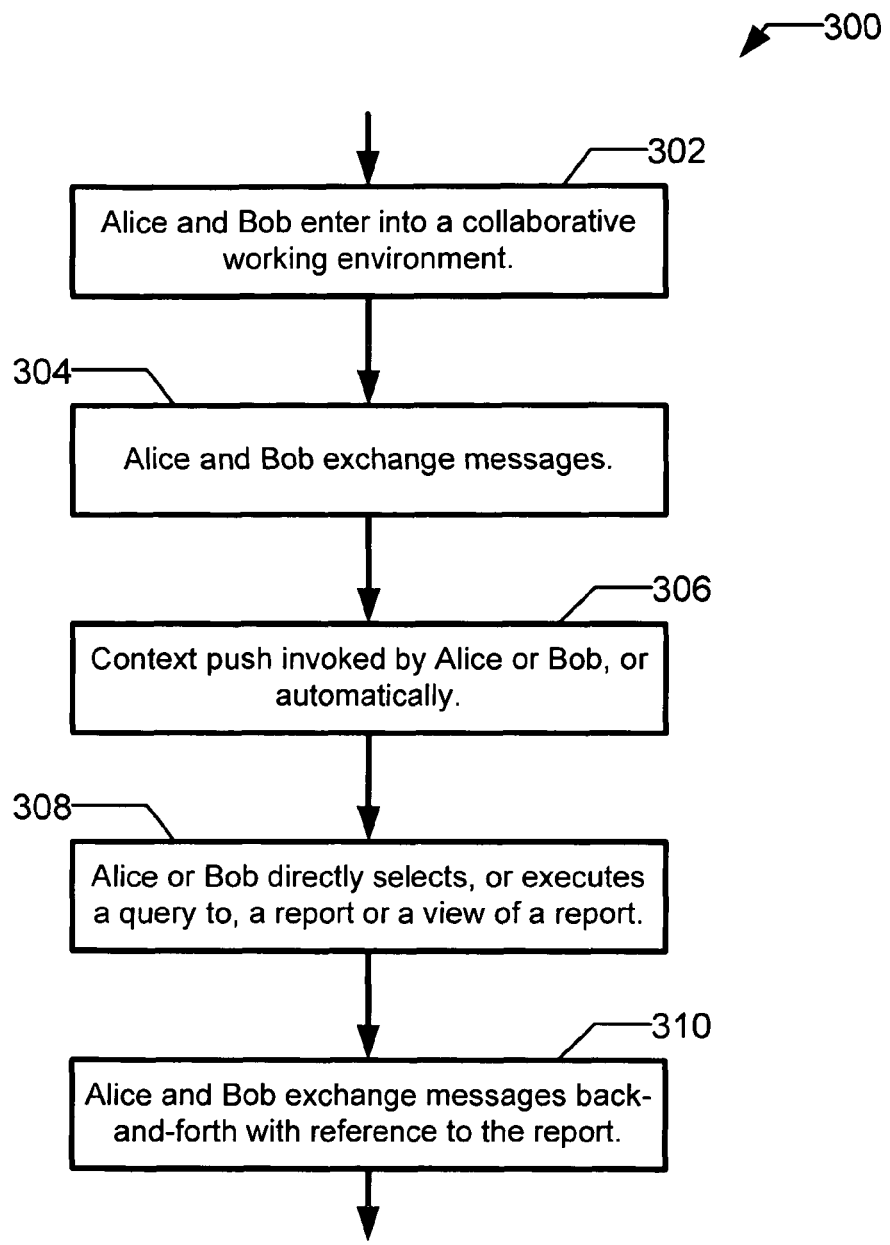
FIG. 3 illustrates a workflow associated with an embodiment of the invention.

FIG. 3 illustrates a workflow for sharing a report document and implementing searches of the report document within a collaborative working environment 300. In the first operation of FIG. 3, users Alice and Bob enter into a collaborative working environment 302. For example, they start an instant messaging conversation, engage in an email exchange, log on to a discussion forum, or the like.

In operation 304, Alice and Bob exchange messages. The exchange is through the input/output devices 104 of their respective computers 130-A and 130-B. These messages can be logged at the server or a local copy is stored on computer 130-A or computer 130-B. The messages are mined for context. This context is used to locate reports that can be inferred to be part of the context or a natural extension of the context. Context can also be mined from the users interaction with a document. For example, drilling down in a report or clicking through on hypertext adds to the context found in the digest of an instant messenger chat, email thread, or forum thread. Interactions with a report document that may be mined for context include: drilling down, backing out, rolling up, filtering, providing a parameter, clicking through to a sub-report document, refreshing, paging up, paging down, opening, and closing.

Alice or Bob invokes a context push 306. A context push is where the user sends context that the users have generated to executable instructions in a local or server based search module. This search module such as a sub-module of BI module 214 takes the context and suggests documents (e.g., reports). The suggestion can be in the form of a query over a set of reports or within a report. Or it can be a report or a view of a report. The query to a report can include pre-populating a search box with a series of terms. The query can include presenting the users with a suggested ad hoc query, e.g., a grammatically correct, user friendly structured query. The query can include presenting the users with a pre-populated data source query in a form language, e.g., SQL. In an embodiment, the suggestion includes a query to a report and a link to a view of a report.

Methods of constructing grammatically correct, user friendly structured queries are described in the commonly owned U.S. patent application entitled "Apparatus and Method for Deterministically Constructing a Text Question for Application to a Data Source", Ser. No. 11/102,488, filed Apr. 7, 2005 the contents of which are incorporated by reference herein.

Alice or Bob directly selects, or executes a query to, a report or a view of a report 308. Alice or Bob can augment the query by adding to the search terms or adjusting the ad hoc query. A report opens for Alice or Bob such that it is displayed on an output device. Alternative methods of opening and sharing a report document are described in U.S. patent application entitled "Apparatus and Method for Report Sharing within an Instant Messaging Framework", Ser. No. 11/394, 641, filed Mar. 31, 2006. In operation 310, Alice and Bob exchange messages back-and-forth with reference to the report.

Figure 4:
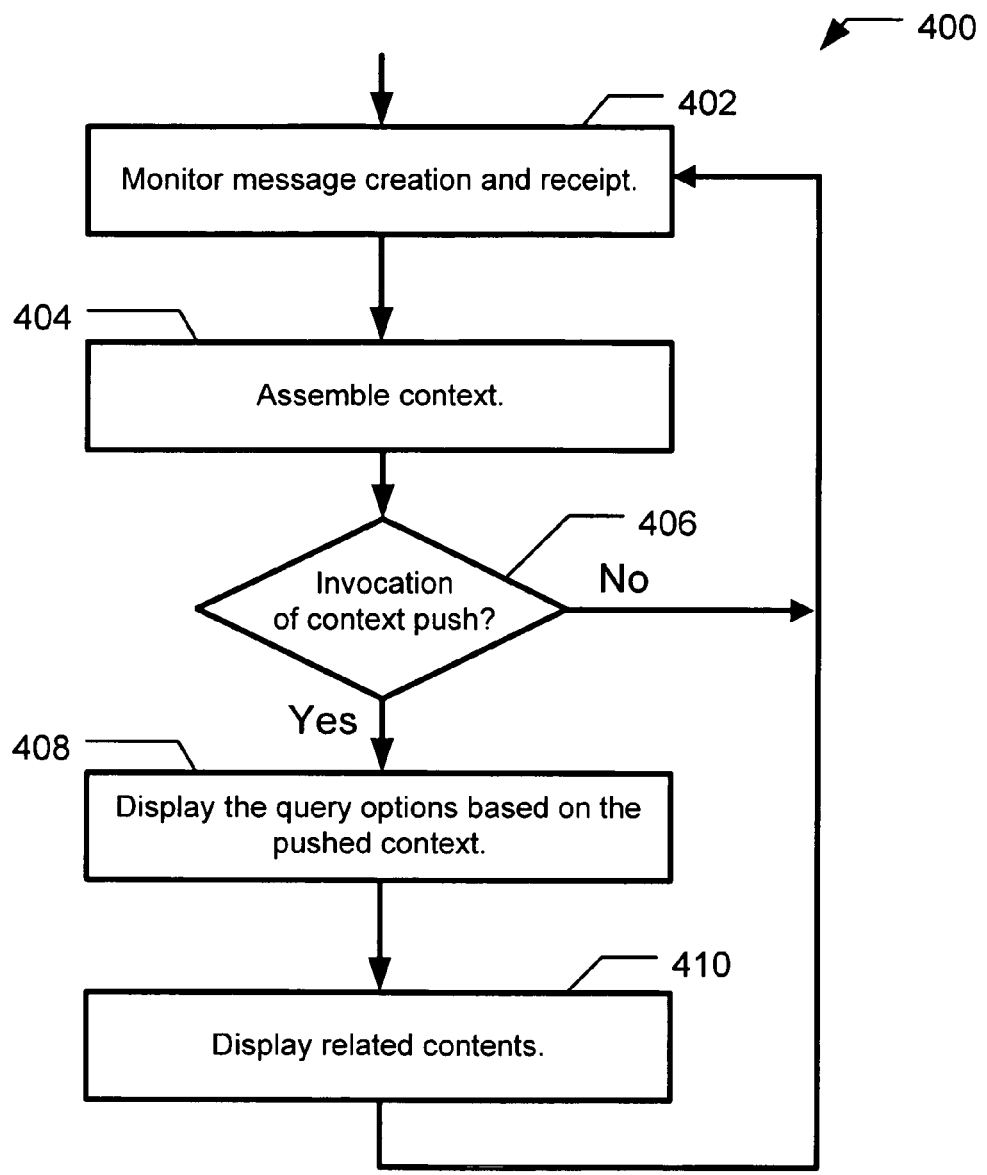
FIG. 4 illustrates a series of processing operations associated with an embodiment of the invention.

FIG. 4 illustrates a series of processing operations for implementing searches of shared report documents within a collaborative working environment 400. In the first processing operation of FIG. 4, the server monitors message creation and receipt 402. The server waits for messages to be sent between Alice and Bob. The server assembles context from the messages 404. The server parses the messages for search terms. These search terms are then associated with specific views. The server waits for invocation of context push 406. The server presents one or both users a series of search terms, links to different documents (with or without refined views of those documents), or a pre-populating ad hoc query 408. The server receives an input from a user and displays the related contents 410.

In an embodiment of the invention, the messages are found in an instant messenger framework. In another embodiment, the messages are found in an email thread. In both cases, text messages, optionally with attached files, are exchanged between Alice and Bob. The server monitors the creation and receipt of messages at Alice's and Bob's computer. In an embodiment of the invention, the messages are found on an Internet forum.

In processing operation 404 context is collected. In an embodiment, context comes from one or more of the following sources: who the users Alice and Bob are, what they are talking about, and what document they are interacting with. In one embodiment, Alice and Bob's roles in the organization and security are used to establish context. In one embodiment, context is collected by parsing the message text. In another embodiment, context is collected by capturing the users' interactions with a shared report.

In processing operation 406, the server waits for invocation of context push. If there is a context push (406—Yes) the processing continues in operation 408. For example, a context push may be initiated when a user types "suggest" or "find report". If there is no context push (406—No), the processing continues at operation 402 where the context can be further refined.

The server presents one or both users a series of search terms, links to different documents (with or with out refined views), or an ad hoc query 408. The server receives an input from a user and displays the related contents 410.

In an embodiment of the invention, portions of the message text that form the search text are replaced with hypertext comprising the same text and a hyperlink to the associated view.

Figure 5:
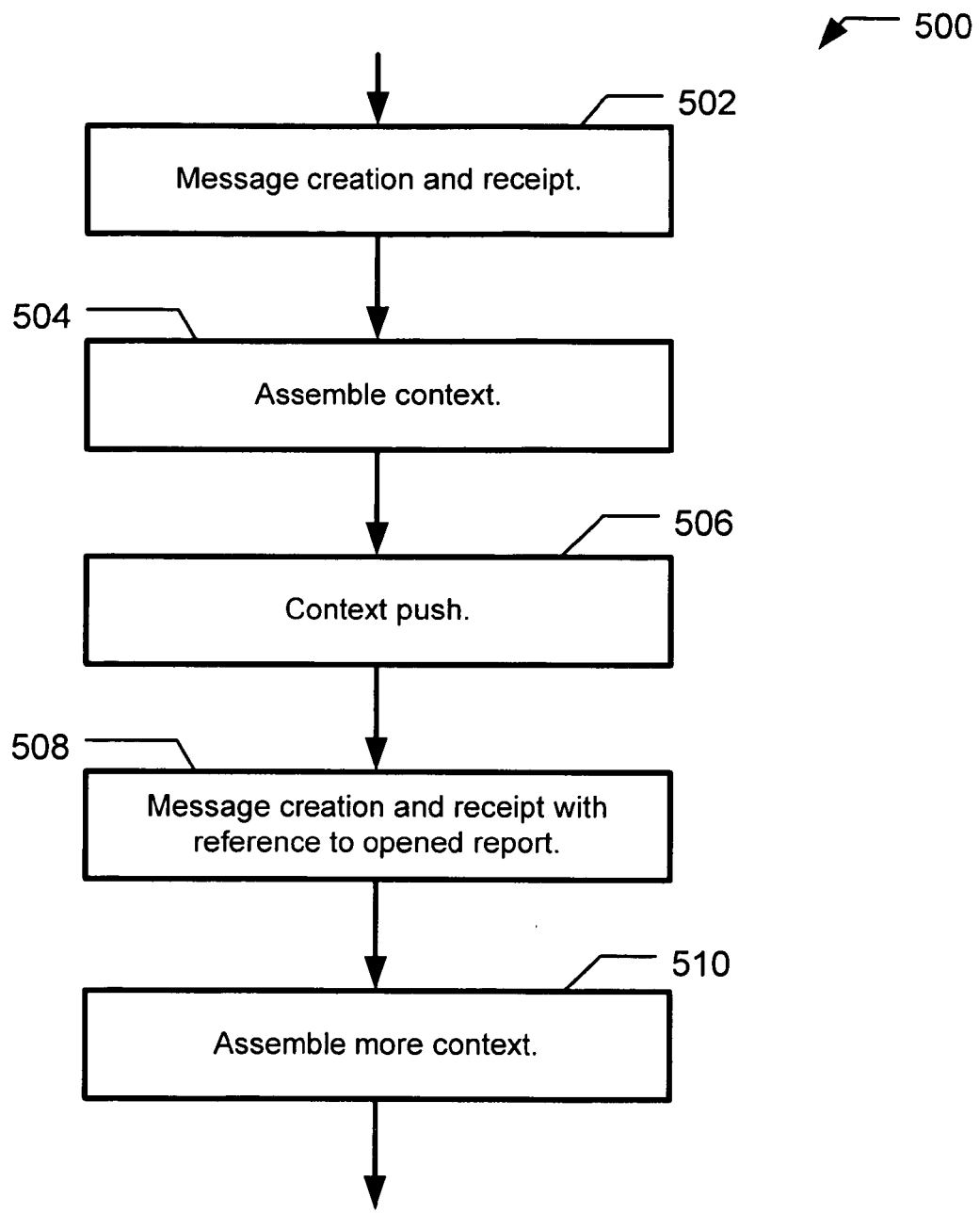
FIG. 5 illustrates a workflow associated with an embodiment of the invention.

FIG. 5 illustrates a workflow associated with an embodiment of the invention. The workflow 500 shows a series of operations for searching across shared report documents and within a report document in a collaborative working environment. Alice and Bob create, send, and receive messages within their collaborative working environment. The server assembles context from the messages 504. Either Alice or Bob invokes a context push 506. The server finds a report that is aligned with the context derived from their messages.

Alice or Bob message back-and-forth with reference to an opened report 508. In this operation they are generating further context which can be mined 510. Interactions with the report create specific context. The next context can be used to search for content within the open report or across all reports. Therefore, an embodiment of the present invention can direct a plurality of users to a specific report and to a specific section of a report.

Figure 6:
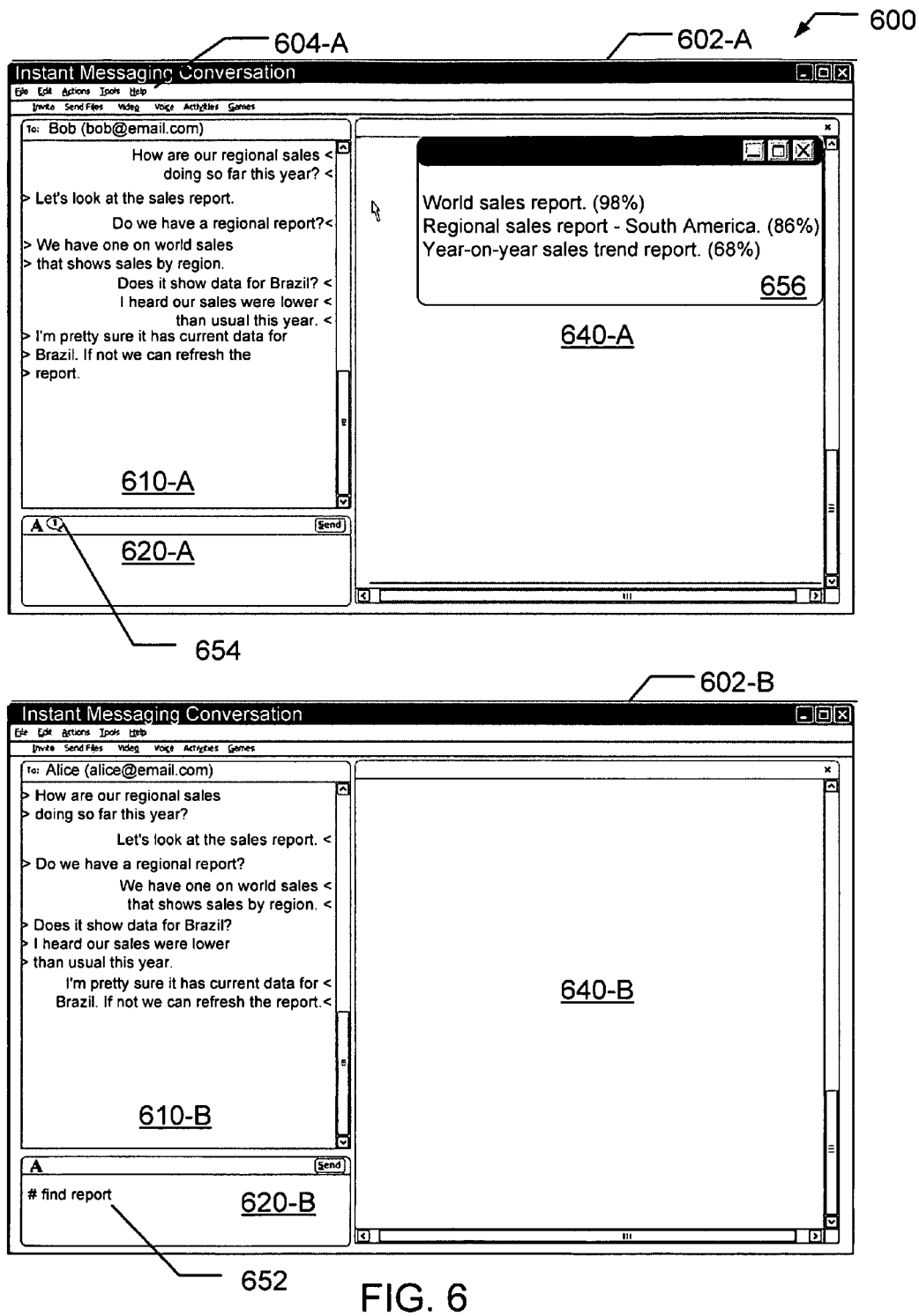
FIG. 6 illustrates two graphical user interfaces (GUIs) that may be utilized in accordance with an embodiment of the invention.

FIG. 6 illustrates two graphical user interface (GUI) 600 windows 602-A and 602-B. Windows 602-A and 602-B belong to Alice and Bob respectively. The GUIs include many standard features. For example, the windows 602-A and 602-B, collectively 602, include a menu bar 604. The windows each include a conversation digest pane 610, i.e., 610-A and 610-B. The second pane in window 602 is an input pane 620, where Alice and Bob enter their text messages for each other.

The GUIs include features configured in accordance with aspects of the invention. The third pane in windows 602 is the report pane 640. Here the contents of a report are displayed and interacted with. Also, an interface for logging on to a report server, searching through a report, displaying help information, and the like can be displayed in the report pane 640. The report pane 640 can also contain a non-report document. In an embodiment, the report pane 640 is a shared workspace for Alice and Bob where many reports and non-report documents can be interacted with at once.

FIG. 6 also illustrates work flows associated the invention. First, an example of the operations 302 and 304 of FIG. 3 and operations 402 and 404 of FIG. 4 are shown in FIG. 6. Alice and Bob start an instant messaging conversation. This conversation, Alice: "How are our regional sales doing so far this year?", Bob: "Let's look at the sales report.", et seq., is recorded in the conversation digest panes 610-A and 610-B. Context is collected from this message exchange. Second, an example of the operation 306 of FIG. 3 and operation 406 of FIG. 4 are also shown in FIG. 6. Alice or Bob can invoke a content push. This can be done in a variety of ways. Bob could type "#find report" in his input pane 620-B, 652. Alice could click on an icon in her GUI 654. In an embodiment of the invention, context is automatically pushed with each message sent. A discovery panel 656 can float on the report pane 640. The discovery panel 656 suggests documents (e.g., reports) from the context as of the last message received or sent. The suggestion can be in the form of a query to a report. Or it can directly be a report or a view of a report.

Figure 7:
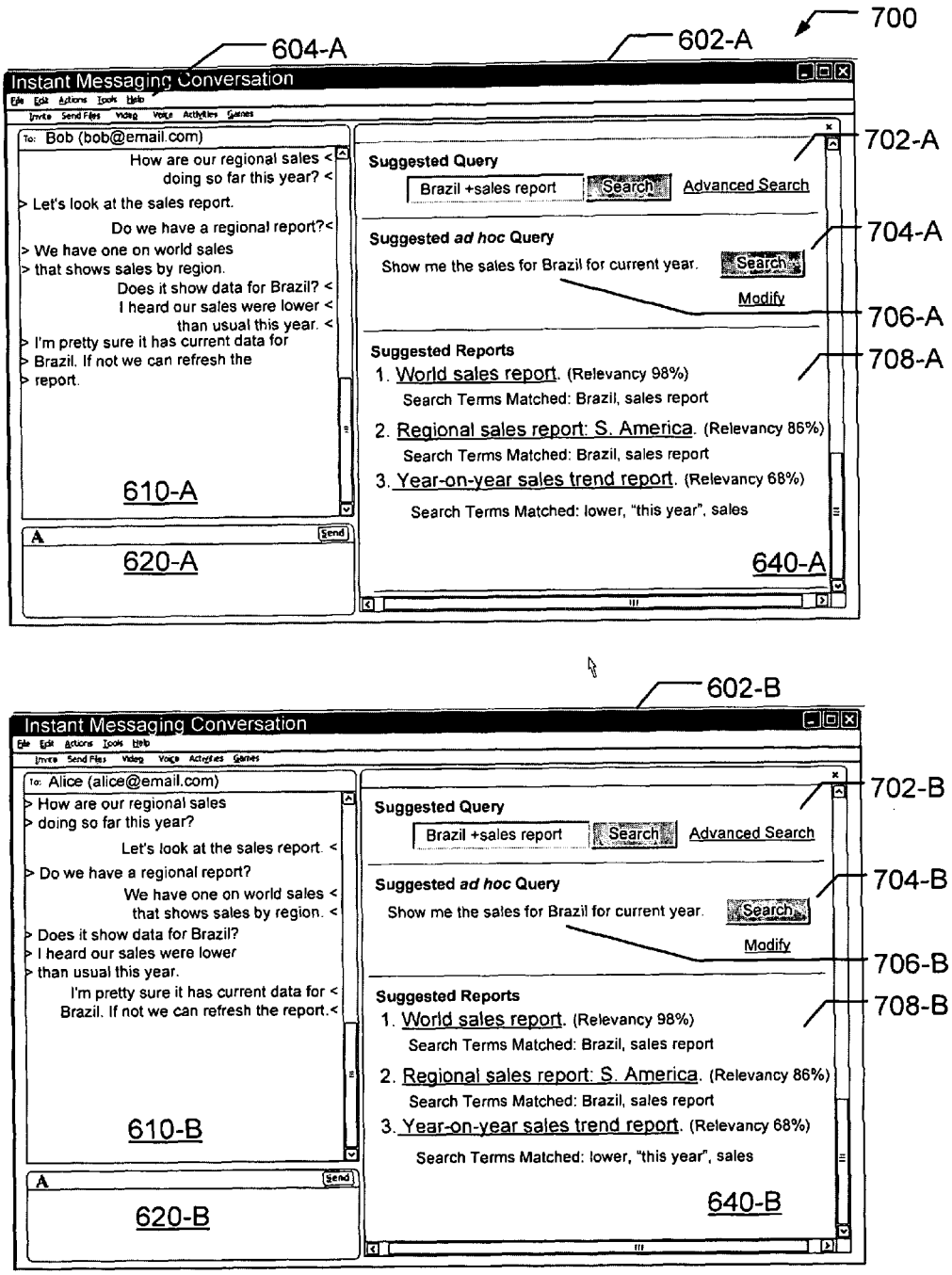
FIG. 7 illustrates a workflow involving the GUIs of FIG. 6.

FIG. 7 illustrates a workflow involving the GUIs of FIG. 6. FIG. 7 shows the result of context being pushed to the instant messenger server. The assembled context from the one or more messages in the message digest in pane 610 is used to create the query options in pane 640. Three examples of suggesting report documents are shown in report pane 640. First, a series of search terms pre-populate a search box included in region 702. These search terms can be edited by Alice or Bob and then be executed. The edits either user makes are visible to the other user. Second, an ad hoc query 706 is included in region 704. This ad hoc query can be edited and executed. Third, a series of reports and views within reports are listed. A relevancy value for each report is included in this example. The key words matched in the report are also included. A formal language query could be pre-populated in addition to or instead of the above example. In an embodiment of the present invention one or more of the foregoing examples for suggesting report documents within the report pane 640 can be employed.

Figure 8:
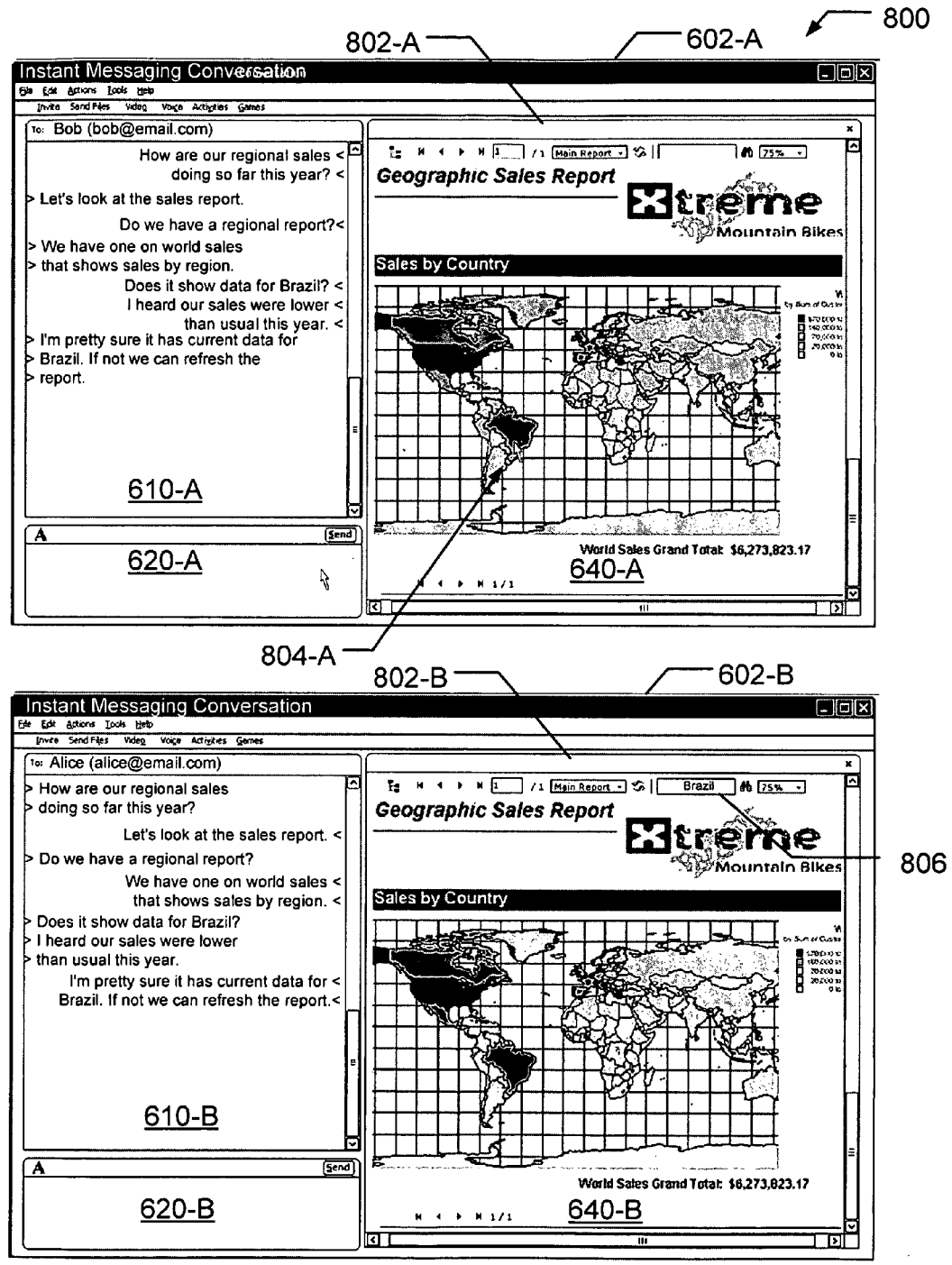
FIG. 8 illustrates a workflow involving the GUIs of FIG. 6.

FIG. 8 illustrates a workflow involving the GUIs of FIG. 6. A report is shown in the report pane 640. Alice drills down on the data for Brazil by clicking on the depiction of Brazil 804-A in her report pane 640-A. Alternatively, Bob searches the report by specifying a parameter in search box 806. These interactions are used to further refine the context of Alice and Bob's interaction. In an embodiment, Alice and Bob push the context to the server to search within the report.

Figure 9:
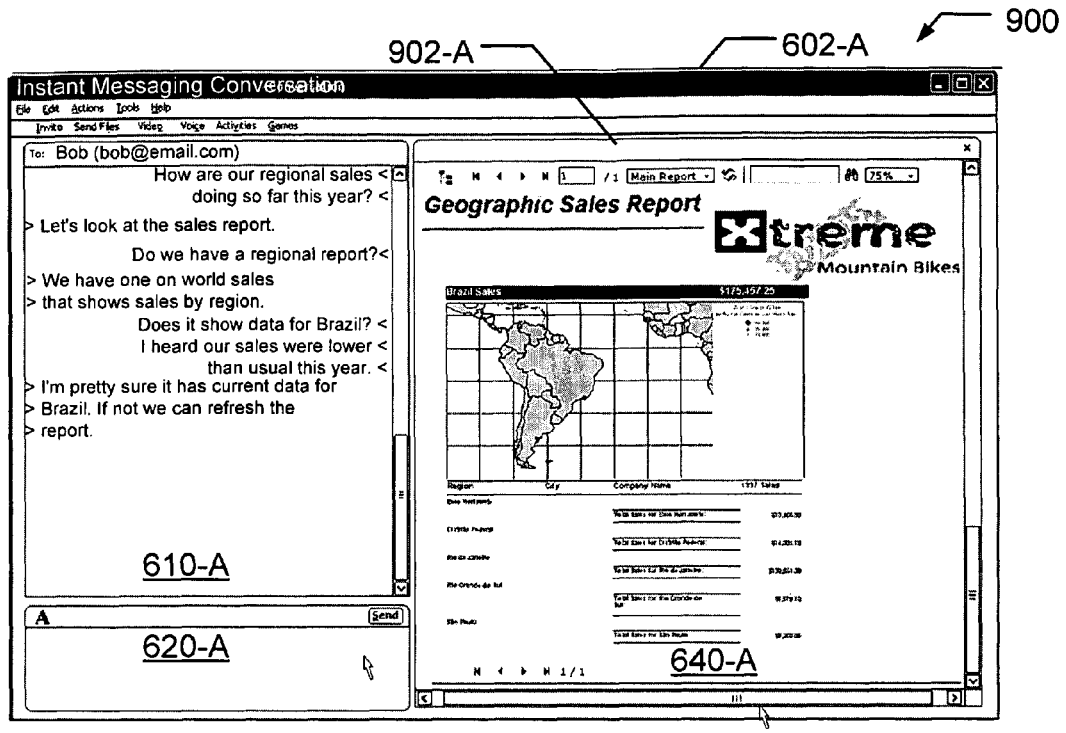
FIG. 9 illustrates a workflow involving the GUIs of FIG. 6.
Figure 9:
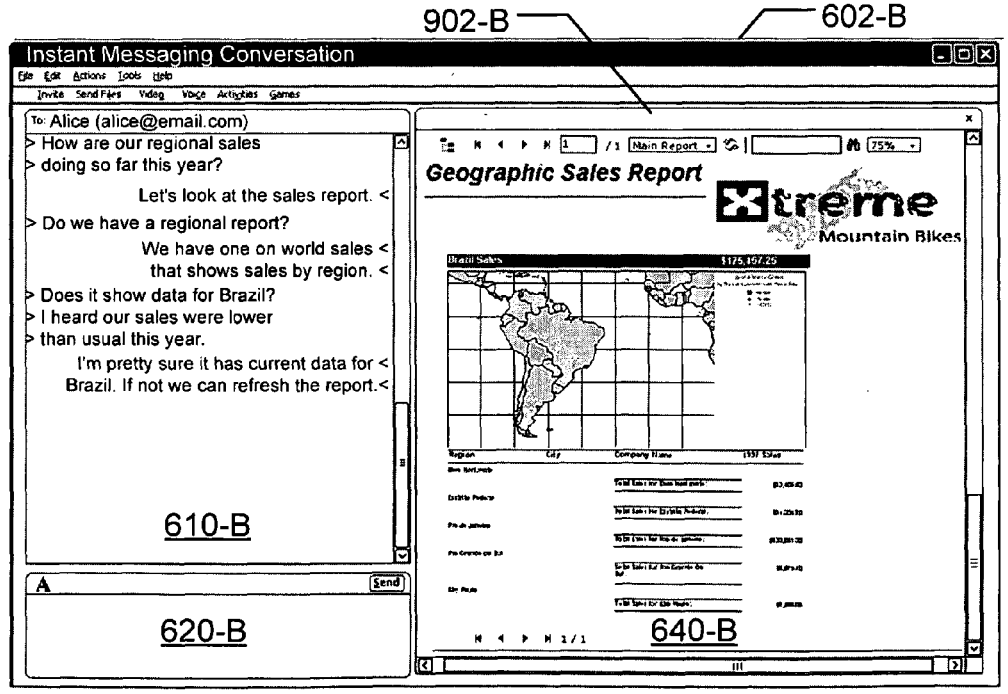

FIG. 9 illustrates a workflow involving the GUIs of FIG. 6. An updated view of the report from FIG. 8 is shown in the report pane 640. While FIGS. 6-9 show GUIs and workflows for an instant messenger product they clearly suggest GUIs and workflows for an Internet forum product. Both products are examples of collaborative working environments hosted by a server.

Figure 10:
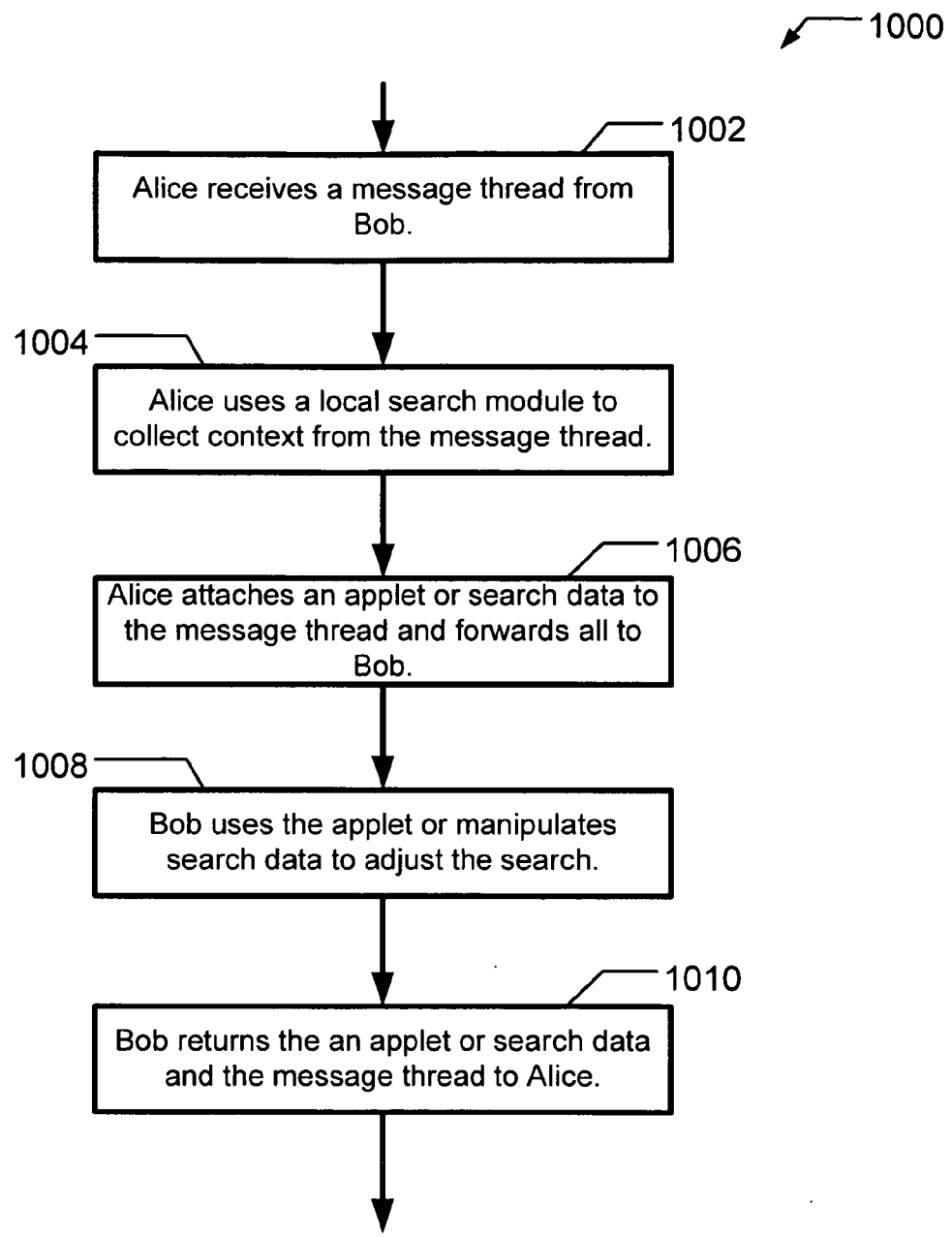
FIG. 10 illustrates a workflow associated with an embodiment of the invention.

FIG. 10 illustrates a workflow associated with an email exchange example of a collaborative working environment. Alice receives a message thread from Bob 1002. The thread contains one or more messages. Alice then applies executable instruction from a context harvest module 118-A on her computer 130-A to collect context from the message thread 1004. In operation 1006, Alice attaches an applet or search data to be used by a local context harvest module 118-B on Bobs' computer 130-B to the message thread. Alice forwards the thread and attachment to Bob 1006. Bob uses the applet or manipulates search data to adjust the search 1008. Bob returns the applet or search data and the message thread to Alice 1010. In an embodiment, the applet is thin, e.g., designed to act as an interface to a module with executable instructions for mining context or searching. In an embodiment, the roles of Alice and Bob are reversed.

An aspect of the invention is a report that can be shared in accordance with a contemporary working style within a collaborative environment. In accordance with an embodiment of the invention, context is pushed to a computer running executable instructions to convert the context into a request for a report, a query over many reports, a query within a report, etc.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions, such as executing a query against a database.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
   gathering a first plurality of messages between a first computer and a second computer;
   mining the first plurality of messages for context, wherein the context includes the relationship between messages, who sent a message and who received a message, wherein the context is used to generate search terms;
   forming a query with the search terms;
   locating reports in response to the query, wherein each report includes information automatically retrieved from a data source, where the information is structured in accordance with a report schema; and
   displaying at least one report adjacent to a display of the first plurality of messages.

2. The computer implemented method of claim 1, further comprising:
   gathering a second plurality of messages between the first computer and the second computer that reference a selected report.

3. The computer implemented method of claim 1 further comprising, creating a log of the first plurality of messages.

4. The computer implemented method of claim 3 wherein, mining the first plurality of messages for context occurs before the log of the first plurality of messages is created.

5. The computer implemented method of claim 3 further comprising mining the log of the first plurality of messages for context of a collaborative working environment.

6. The computer implemented method of claim 1 wherein natural language processing is used in mining the first plurality of messages for context of a collaborative working environment.

7. The computer readable medium of claim 1 wherein locating is performed in response to a context push.

8. The computer implemented method of claim 1 wherein forming a query includes presenting the query to a user.

9. A computer readable medium including executable instructions, comprising instructions to:
   facilitate an instant messaging conversation between a first computer and a second computer on a network;
   process text from the instant messaging conversation;
   extract context of the instant messaging conversation, wherein the context includes roles of individuals participating in the instant messaging conversation, wherein the context is used to generate search terms;
   use the context to form a query with the search terms;
   apply the query to a plurality of report documents, wherein each report document includes information automatically retrieved from a data source, where the information is structured in accordance with a report schema;
   display report documents retrieved in response to the query adjacent to a display of the instant messaging conversation;
   identify a selected report document from the plurality of report documents; and
   extract context from an interaction with the selected report document.

10. The computer readable medium of claim 9 wherein the interaction includes at least one of: drilling down in the selected report document, rolling up in the selected report document, clicking through to a sub-report document, backing out of the selected report document, filtering the selected report document, providing a parameter to the selected report document, refreshing the selected report document, paging up in the selected report document, paging down in the selected report document, opening the selected report document, and closing the selected report document.

11. The computer readable medium of claim 9 further comprising executable instructions to present the query to a user.

12. A computer readable medium including executable instructions, comprising instructions to:
- monitor the exchange of messages between a first computer and a second computer in a network;
- assemble context from the messages, wherein the context includes the meaning of messages and wherein the context is used to generate search terms;
- use the context to form a query with the search terms;
- apply the query to one or more report documents, wherein each report document includes information automatically retrieved from a data source, where the information is structured in accordance with a report schema;
- direct a plurality of users to a specific report identified by the query;
- display, for each user of the plurality of users, the specified report adjacent to a display of the messages; and
- assemble context from a set of interactions that a first user at the first computer and a second user at the second computer has with a selected report document.

13. The computer readable medium of claim 12 further comprising executable instructions to present the query to a user.

* * * * *